Figure 1:
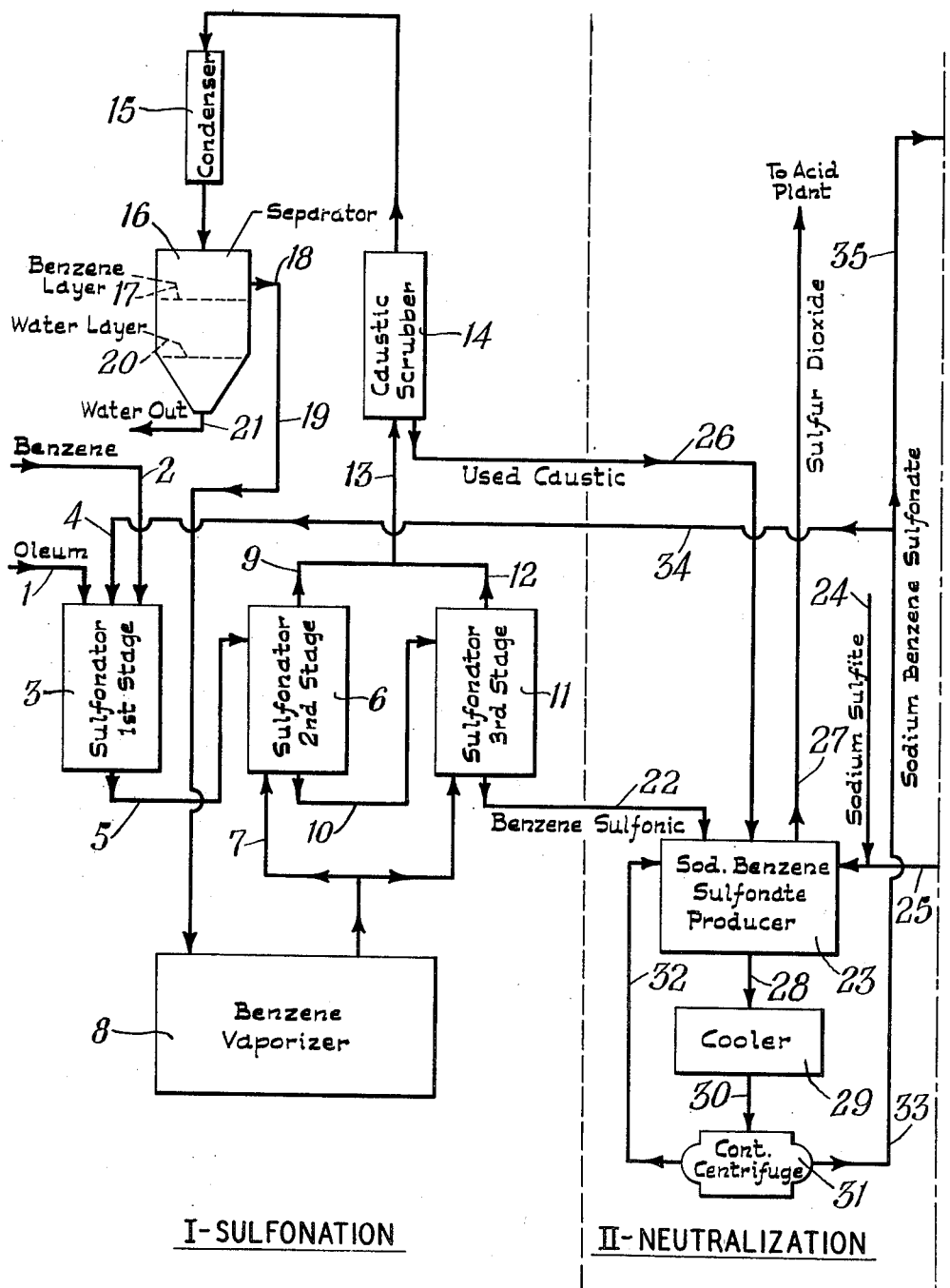

INVENTORS
VITTORIO MOLINARI
HERBERT G. AFFHOLTER
BY
D.C. Harrison
ATTORNEY

Patented Dec. 18, 1951

2,578,823

UNITED STATES PATENT OFFICE 2,578,823

PREPARATION OF PHENOLS

Vittorio Molinari, Plainfield, and Herbert G. Affholter, Bound Brook, N. J., assignors, by mesne assignments, to Union Carbide and Carbon Corporation, a corporation of New York Application September 8, 1948, Serial No. 48,292

1 Claim. (Cl. 260—628)

This invention relates to the preparation of phenol from benzene by the sulfonation process. The "classical" sulfonation procedure consists in reacting benzene with sulfuric acid to form benzene sulfonic acid, neutralizing with milk of lime, filtering out the resulting calcium sulfate, and treating the filtrate with sodium carbonate to give sodium benzene sulfonate. The sodium benzene sulfonate is dissolved in a melt or fusion of caustic soda and stirred for several hours, and a reaction conforming to the equation, $$C_6H_5SO_3Na + 2NaOH = C_6H_5ONa + Na_2SO_3 + H_2O$$

ensues. The fusion product is poured into water and the phenol is released from the sodium phenate, usually with sulfuric acid. While, theoretically, two moles of caustic is sufficient for the fusion, normal practice requires about three moles to maintain a fused liquid state and to control the foaming. For this reason, the process is relatively expensive.

According to the present invention, the caustic soda reaction is replaced in a process which can be expressed by the overall reaction equation $$C_6H_6 + \tfrac{1}{2}H_2SO_4 + \tfrac{1}{2}Ca(OH)_2 + \tfrac{1}{2}O = C_6H_5OH + \tfrac{1}{2}CaSO_3 + H_2O$$

Instead, therefore, of the consumption of two and more moles of caustic soda required by the "classical" process, the present invention utilizes one-half mole of the much cheaper and prevalent lime converted to the sulfite for each mole of phenol produced, and the sulfuric acid consumption is also reduced to about one-half mole. The cost of phenol production is thus considerably lessened.

The accomplishments of this invention are brought about by a combination of steps:

I. Sulfonation of benzene, $$C_6H_6 + H_2SO_4 = C_6H_5SO_3H + H_2O$$

II. Neutralization to sodium benzene sulfonate,

$$C_6H_5SO_3Na + \tfrac{1}{2}SO_2 + \tfrac{1}{2}H_2O$$

with the acid recovery, $$\tfrac{1}{2}SO_2 + \tfrac{1}{2}H_2O + \tfrac{1}{2}O = \tfrac{1}{2}2H_2SO_4$$

III. Hydrolysis of a solution of sodium benzene sulfonate in fused sodium phenate, $$C_6H_5SO_3Na + C_6H_5ONa + H_2O = 2C_6H_5OH + Na_2SO_3$$

IV. Phenate formation from one-half the phenol,

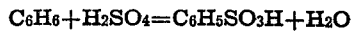
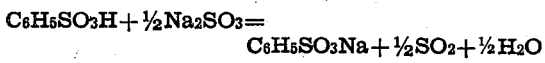
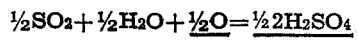
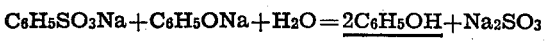
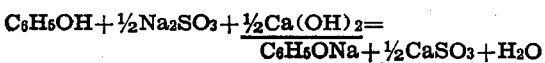

Combining these equations gives the overall theoretical reaction expressed above. For the caustic fusion of the prior art is substituted the hydrolysis yielding the sodium sulfite which is utilized in preparing both the sulfonate and the phenate for the hydrolysis step. In the phenate preparation, the lime plays the part of forming an insoluble sulfite that precipitates to leave the sodium in the system for recycling.

Further improvements provided by the invention reside in the steps, whereby a continuous process is made possible with the substantially overall result that benzene and sulfuric acid can be charged continuously at one end of the apparatus (with lime added in step IV), and a stream of phenol is discharged at the other end. These step improvements are set out in the description of the process that follows.

A preferred form of this invention will be described in greater detail with reference to the accompanying drawings, which comprise a purely diagrammatic flow chart, illustrating in Fig. 1 the sulphonation and neutralization steps and in Fig. 2 the hydrolysis and phenation steps in a continuous process according to the invention.

I. Sulfonation of benzene

The sulfonation of benzene by reacting with sulfuric acid as normally practiced is (1) feeding oleum (solution of 20% sulfur trioxide in 98% sulfuric acid) into liquid benzene at a rate such that the temperature is held between 70°–80° C. In this operation the water of reaction dilutes the sulfuric acid to the extent that it is no longer able to sulfonate the benzene. It is the normal practice therefore to complete the utilization of the dilute sulfuric acid by (2) a second step of passing through the mass vapors of benzene that azeotropically distill the water present and so concentrate the acid and enable the continuation of the sulfonation of the benzene to continuously decrease the free sulfuric acid content. When all but about 10 per cent of the sulfuric acid has been reacted, diphenyl sulfone starts forming according to the reaction:

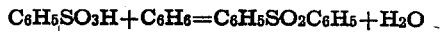

This formation entails appreciable losses of both benzene and sulfuric acid as well as constituting an objectionable by-product for removal.

The present invention provides sulfonation at such high yields of benzene-monosulfonic acid as to be free from objectionable amounts of the by-products (benzene-disulfonic acid and diphenyl-sulfone) and in a condition for neutralization to the sodium salt without any purification step. Briefly this accomplishment is brought about by the inclusion of a salt that acts as an inhibitor of the by-product formation. The salt is preferably sodium benzene sulphonate which does not import any ingredients requiring separation, but it can be any sodium salt engendering benzene sulfonate in the reaction such as the carbonate, sulfate, or sulfite.

For the continuous process, illustrated by the flow chart, the sulphonation step is preferably operated in three stages as shown on the left hand side of Fig. 1; the benzene is in the liquid phase in the first stage and in the vapor phase in the last two stages.

In the first stage, oleum (20% sulphur trioxide in 98% sulphuric acid) and liquid benzene in slight excess of molar ratio are fed concurrently in continuous streams 1 and 2 to the sulphonator 3 at a rate such that the sulphonator 3 is held to a constant temperature of about 60° to 80° C. At this temperature and ratio of reactants there is little tendency to form benzene-disulphonic acid. In addition to the oleum and benzene, there is also charged continuously into the sulphonator at 4 from about 5 to 10 per cent, based on the weight of the reactants, of sodium benzene sulphonate that inhibits the diphenyl-sulphone reaction. By these means, therefore, objectionable amounts of the contaminants, di-sulphonic acid and diphenyl-sulphone, are prevented from forming in the first stage. The flow through the sulphonator is adjusted so that the ratio of the reactants and product in the discharged stream 5 is about 50 per cent benzene-monosulphonic acid with a content of about 29 per cent of free sulphuric acid and the remainder benzene.

In the second stage, the stream of benzene-sulphonic acid is fed from 5 to the next sulphonator 6, where the temperature is kept between 150° and 170° C. Here benzene vapors are supplied at 7 from benzene evaporator 8 and are bubbled upwardly (or countercurrently) through the down-flowing agitated liquid mass. This stage is operated to yield about 30 per cent of additional benzene sulfonic acid. The vapors of benzene, entrained water and acid are discharged at 9 from the top of the sulphonator. The stream discharged at 10 passes to the next sulphonator 11.

For the third stage the concentration of benzene sulphonic acid passing through the sulphonator 11 is comparatively high, while that of the sulphuric acid is very low, which condition enhances the tendency to form diphenyl-sulphone. Even in this stage, however, the sodium salt carried in the stream is an effective inhibitor. The third stage, also operated between 150° and 170° C., is a "clean-up" operation for converting the remaining free sulphuric acid to less than 3%, whereby a final content of 93 to 94% of benzene-monosulphonic acid is obtained with no objectionable amounts of contaminants.

The vapors arising from the second and third sulphonators 6 and 11 are directed via 9, 12 and 13 through a caustic (NaOH) scrubber 14 kept at 100° C. Here entrained sulphonic acid is reacted to sodium sulphonate but without any condensation of benzene and water. The vapors, thus freed from the corrosive acid, then pass to a condenser 15 and a separator 16. The benzene layer 17 overflows at 18 and is carried via 19 to the evaporator 8 that supplies the benzene vapor for the second and third sulphonators 6 and 11. The water layer 20 is discharged to waste at 21.

In the sulphonator 11 temperatures are maintained constant; this is necessary to a continuous process in order that the reaction conditions remain uniform at all times.

II. *Neutralization to the sodium salt*

As received from the sulphonators at 22 the liquid benzene sulphonic acid (with its added content of sodium benzene sulphonate) is sufficiently free from contaminants so as to require no further purification. It is therefore fed directly to the neutralizer or sulphonate producer 23 held at about 105° C.; the solid sodium sulphite also added via 24 makes a viscous mass, and this is diluted at 25 by an incoming supply of mother liquor subsequently separated. In the neutralizer 23 the used caustic containing sodium benzene sulphonate from the scrubber 14 is added to the system via 26 compensating for sodium losses encountered in the process. In the neutralizer sulphur dioxide is driven off at 27 and may be sent to an acid recovery plant.

The hot solution is discharged at 28 without concentration into a cooler 29 (30°–50° C.) where the sodium benzene sulphonate precipitates in the form of flaky crystals the mixture being fed via 30 to a continuous centrifuge 31. The moist salt crystals discharged by the centrifuge are in fit condition for the next step of the process. The separated mother liquor is returned via 32 to the neutralizer 23; and its recycling does not evidence any accumulation of impurities, even though the sodium sulphite fed to the neutralizer is a by-product of the next step of the process. Sodium benzene sulphonate is discharged at 33, some passing via 34 to the inlet 4 of sulphonator 3 and the remainder passing via 35 to the hydrolysis stage.

An alternative step of neutralization, and now found preferable, is feeding the sulfonation mass in a melted condition as it comes from the sulfonator directly to a kneader or the like containing solid sodium sulfite obtained as a by-product in the succeeding hydrolysis step of the process; both reactants can be supplied continuously to the kneader. Sulfur dioxide gas develops immediately in the kneader, which gas is removed, and the sodium benzene sulfonate formed is discharged as dry powder; the temperature is maintained sufficiently high to avoid having any of the gas remaining in the powder, and the sulfur dioxide gas is returned to the sulfuric acid plant. The dry sodium benzene sulfonate as obtained is in condition for the next step of hydrolysis.

III. *Hydrolysis*

Figure 2:
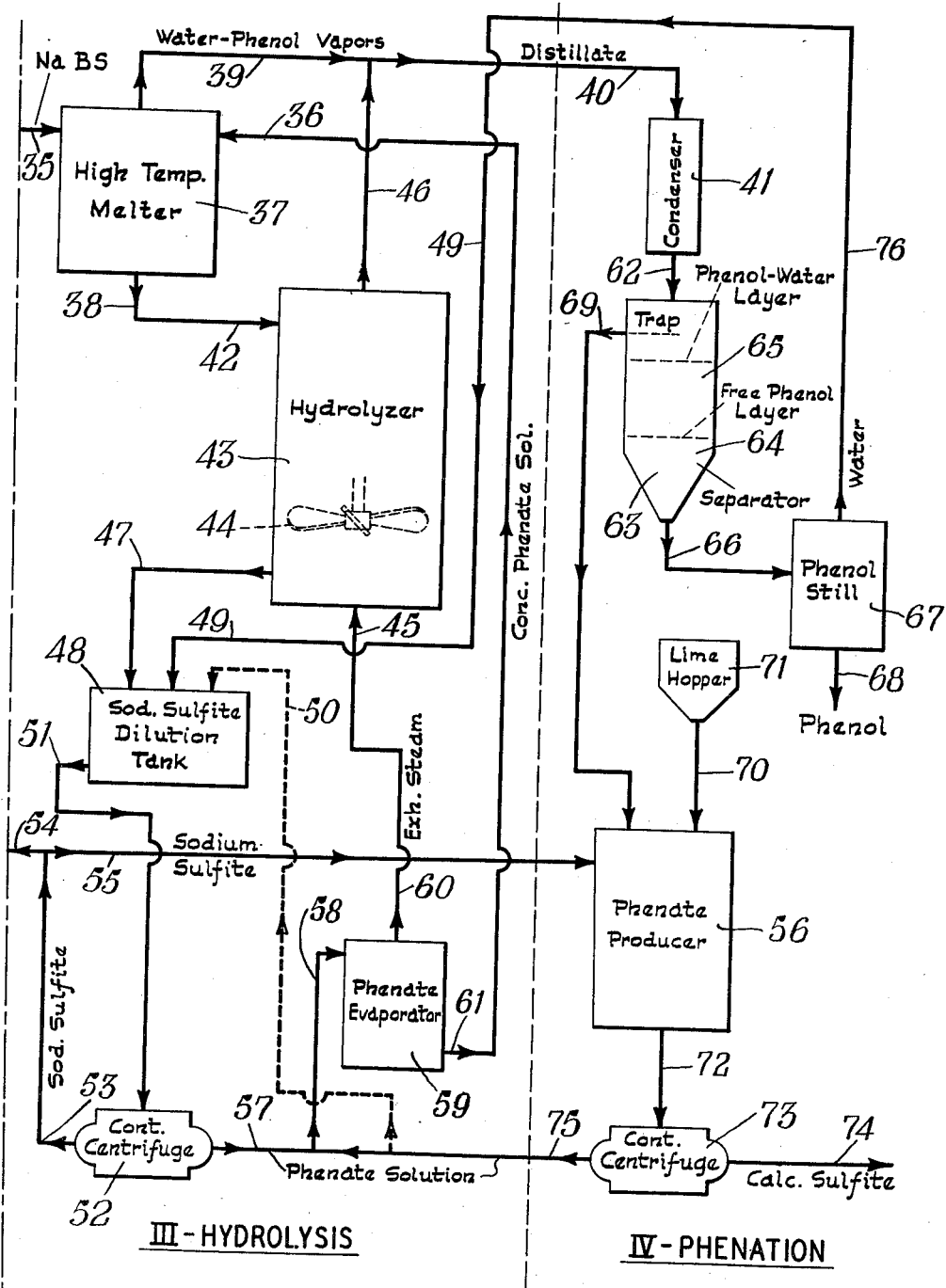

In this step, shown in Fig. 2, free phenol is distilled by the passage of dry steam through melted sodium phenate having the sodium benzene sulphonate salt dissolved therein. For the hydrolysis to proceed, the melt must be substantially anhydrous and maintained liquid at the temperature of reaction. It is also essential that the temperature of hydrolysis be subject to close control; otherwise diphenyl oxide is apt to form, and this tendency increases with a rise in the temperature above 370°–390° C.

It has now been found that the hydrolysis can be most satisfactorily carried out in continuous operation by separating the step of hydroysis from the step of melting. For this reason concentrated sodium phenate solution in excess and the sodium benzene sulphonate powder is charged in a continuous flow from 35 and 36 into a closed melter 37 where they are brought to a temperature of about 300°–310° C. By this operation the sodium phenate is dehydrated and melted with the sulphonate dissolved therein. Consequently, a uniform anhydrous mass at the required temperature is continuously drawn from the melter at 38. In the melter 37 some phenol is released by hydrolysis and the water vapors carry it via 39 and 40 to the condenser. The molten mass delivered from the melter 37 at 42 is led to a hydrolyzer 43, provided with an agitator 44 and maintained at about 325° to 330° C., and dry steam is passed through it from 45. The steam emerging from the hydrolyzer at 46 carries the phenol and it passes with the vapors from 39 into 40 and thence into condenser 41. The sodium phenate, in an excess necessary for maintaining a liquid melt, is drawn from the hydrolyzer 43 via 47 into a tank 48 where it is diluted to 30° Baumé at 160° C. with phenolic water distilled in a subsequent operation of distillation of the crude phenol via 49 or with dilute phenates obtained in subsequent operation via 50. At this concentration anhydrous sodium sulfite precipitates. The sulphite crystals are discharged at 51 and separated in the continuous centrifuge 52 from the phenate solution. The sodium sulphite passes out via 53 and one-half of it goes via 54 to 25 and thence the neutralizer 23 (Fig. 1) and the remainder goes via 55 to the phenate producer 56. The phenate solution is returned via 57 and 58 from the centrifuge 52 to an evaporator 59 to be concentrated and returned to the cycle for the hydrolysis step. Water evaporated in this operation is conveniently used to supply the steam for the hydrolyzer 43 passing thence via 60 and 45; the phenate so concentrated is returned to the melter 37 via 61 and 36.

In this step an excess of phenate over the stoichiometric proportion for hydrolysis is maintained in order that the mass is liquid at all times. The melter functions as a cushion to maintain the high temperature in the hydrolyzer as well as to furnish an anhydrous stream of the salts.

IV. *Phenate formation*

In the hydrolysis step previously described it is necessary to have a continuous supply of sodium phenate. Sodium phenate can be produced by reacting free phenol with caustic soda, and caustic soda can be produced by interaction of lime and sodium sulfite. This reaction for obtaining caustic soda has been tried at various concentrations and temperatures for improving the yield, and it has been found that the best conversion to caustic soda (about 74%) occurred by reacting at 100° C. a concentration of sodium sulfite in water of only 5 per cent by weight and 20 per cent excess of the lime; at the same temperature and with the same excess of lime and a 10% sulfite concentration, the conversion was reduced to less than 60%, and at 30% concentration the yield of caustic was less than 30 per cent. This means a highly diluted caustic soda solution requiring separation from the remaining lime and concentration for the hydrolysis. It has been found, however, that when phenol was included (according to the equation previously given), a concentrated solution (25%) of sodium sulfite and only 5% excess of lime gave an 85% yield of sodium phenate at 100° C.; this greatly reduces the concentration required and the loss due to the excess lime.

In this step of preparing the phenate, the distillate from the melter 37 and the hydrolyzer 43 is passed via 39, 46 and 40 through the condenser 41, and the condensate goes via 62 to a separator 63 wherein free phenol collects in a bottom layer 64 while a saturated phenol-water layer 65 rests on top. The lower free phenol layer is drawn off at 66 into a still 67 for distillation; it constitutes the output of product of the process, being discharged at 68. The steam passes via 76 and 49 to dilution tank 48.

The phenol necessary to the production of the phenate in 56 is obtained from the water-phenol layer 65 in separator 63. This is fed via 69 to a phenate producer 56 which is held at 100° C. Into the producer 56 is also charged the remainder of the sodium sulphite separated in the centrifuge or filter 52 and discharged via 55, and lime (5 per cent excess over stoichiometric proportions) is likewise fed at 70 from hopper 71. The phenol reacts with the sodium sulphite and lime in 56 to precipitate the insoluble calcium sulphide and to yield the sodium phenate in solution which is discharged at 72 into a centrifuge 73 which separates the precipitate from the phenate solution. The calcium sulfite, previously washed with water to avoid loss of phenol, is discharged at 74 and the latter at 75 to join feed 57, 58 into evaporator 59 and, if desired, to join feed 57, 50 into dilution tank 48.

This step has the further advantage that it avoids the extraction of phenol from the phenolic water. The amount of phenol to be so recycled as phenate via 61 and 36 is about in molar proportion of the benzene reacted, and this proportion can be controlled in the hydrolysis step.

*Summary*

The particularly outstanding improvements provided by the present invention which make continuous operations possible, can be summarized as follows:

I. Essential reduction in the formation of diphenyl-sulfone in the sulfonation step by the presence of sodium benzene sulfonate, or a salt forming the sulfonate, and a two-stage sulfonation of (a) concurrent liquid phase and (b) countercurrent vapor phase;

II. Preparation of the sulfonate by neutralization with sodium sulfite (formed in the system) and without heat-concentration (cooling and centrifuging being substituted), with the consequent avoidance of foaming, or the preferred alternative of neutralization in the dry state by feeding the melted sulfonic acid into solid sodium sulfite.

III. Hydrolysis of a separately fused anhydrous solution of the sodium benzene sulfonate in sodium phenate to yield free phenol and the sodium sulfite;

IV. Preparation of the phenate for step III from the water solution of phenol formed in the hydrolysis through the action thereon of a slight excess of lime and of sodium sulfite whereby the by-product is calcium sulfite and the sodium is retained in the system.

It is to be noted further that the steps are interdependent to the end of providing a continuous process; the two-stage liquid concurrent and vapor counter-current sulfonation of step I and the sulfonate from step II as the control provide the monosulfonic acid of necessary high yield and purity for step II; the neutralization step II contributes the acid-forming ingredients of sulfur dioxide and water for step I and in addition the sulfonate for controlling the reaction of step I; the hydrolysis of step III supplies the sodium sulfite necessary to steps II and IV; and the phenate of step IV is the active ingredient upon which step III hinges, and its concentration supplies the water for the hydrolysis of step III.

The invention finds its principal utility in the preparation of phenol as set out in the foregoing description. The process, however, is in no essential way altered for preparing other phenols or monohydroxy-aromatic or heterocyclic compounds, such as alkylated hydroxy-benzenes, hydroxynaphthalenes, hydroxy-pyridines, etc., and obtainable from the corresponding mono-sulfonic acids that do not readily decompose or lead to side reactions. Sodium is replaced by potassium and other alkali metals, and calcium can be substituted by other alkaline earth metals.

What is claimed is:

Process for preparing phenol, which comprises feeding concurrently liquid benzene and oleum in substantially molar ratio at a temperature of about 60° to 80° C. for partial conversion into benzene mono-sulfonic acid in the presence of from about 5 to 10 per cent of sodium benzene sulfonate; directing the stream to a separate zone at a temperature of about 150° to 170° C. and passing countercurrently through the mass benzene vapors until a 90 or more per cent monosulfonic acid is formed; neutralizing the sulfonic acid with sodium sulfite at about 105° C., cooling and separating the resulting sodium benzene sulfonate; directing the sulfonate into a mass of melted sodium phenate, discharging the melted mass into a separate zone for passing therethrough dry steam to hydrolyze the melted mass into free phenol and sodium sulfite and to carry off the released phenol; returning the sodium sulfite to the system; condensing the vapors from the hydrolysis, decanting the water-phenol layer of the condensate and drawing off the separated free phenol layer; and reacting the water-phenol layer with the sodium sulfite and lime to form sodium phenate in solution and precipitate calcium sulfite; and returning the sodium phenate solution so formed for concentration to supply steam and sodium phenate for the hydrolysis.

VITTORIO MOLINARI.
HERBERT G. AFFHOLTER.

REFERENCES CITED

The following references are of record in the file of this patent:

UNITED STATES PATENTS

| Number | Name | Date |
|--------|------|------|
| 1,915,925 | Cotton | June 27, 1933 |
| 1,970,556 | Carswell | Aug. 21, 1934 |
| 1,988,156 | Bouvier et al. | Jan. 15, 1935 |
| 1,992,167 | Bouvier et al. | Feb. 26, 1935 |
| 2,007,327 | Carr et al. | July 9, 1935 |
| 2,281,485 | Fellows | Apr. 28, 1942 |
| 2,334,500 | Miller | Nov. 16, 1943 |
| 2,407,045 | Tyrer | Sept. 3, 1946 |